United States Patent
Thinguldstad

(10) Patent No.: US 7,289,731 B2
(45) Date of Patent: Oct. 30, 2007

(54) OPTICAL NETWORK TERMINATION WITH AUTOMATIC DETERMINATION OF GEOGRAPHIC LOCATION

(75) Inventor: Arthur Thinguldstad, Raleigh, NC (US)

(73) Assignee: Alcatel Lucent, Paris (FR)

( * ) Notice: Subject to any disclaimer, the term of this patent is extended or adjusted under 35 U.S.C. 154(b) by 593 days.

(21) Appl. No.: 10/769,054

(22) Filed: Jan. 29, 2004

(65) Prior Publication Data

US 2005/0169631 A1    Aug. 4, 2005

(51) Int. Cl.
*H04J 14/00* (2006.01)

(52) U.S. Cl. .................... 398/66; 398/70; 398/71; 398/72

(58) Field of Classification Search ............ 398/58, 398/155, 10, 17, 25, 66, 68, 118, 107, 115, 398/121, 151, 70–72; 710/10; 370/259; 379/102.04; 359/124
See application file for complete search history.

(56) References Cited

U.S. PATENT DOCUMENTS

| 5,751,246 A | 5/1998 | Hertel |
| 5,835,757 A * | 11/1998 | Oulid-Aissa et al. .......... 707/10 |
| 6,122,350 A * | 9/2000 | Reeder et al. .......... 379/102.04 |
| 6,349,093 B1 * | 2/2002 | Caldwell et al. ............ 370/259 |
| 6,895,189 B1 * | 5/2005 | Bedrosian ................... 398/155 |
| 2003/0076560 A1 | 4/2003 | Pratt et al. |
| 2003/0099014 A1 * | 5/2003 | Egner et al. ................ 359/124 |

FOREIGN PATENT DOCUMENTS

WO    WO 01/75831 A1    10/2001

OTHER PUBLICATIONS

Kun, et al.; Research on CAINONET Performance Real-time Monitoring & Evaluation System; International Conference on Communication Technology Proceedings; Aug. 21-25, 2000; pp. 507-514; vol. 1.

* cited by examiner

*Primary Examiner*—Dalzid Singh
(74) *Attorney, Agent, or Firm*—Jackson Walker, L.L.P.; Bobby D. Slaton

(57) ABSTRACT

An optical network termination (ONT) apparatus can determine its own geographic location information automatically, thereby permitting the ONT to report its geographic location to a management entity in a passive optical network (PON) automatically, without manual intervention.

17 Claims, 1 Drawing Sheet

OPTICAL NETWORK TERMINATION WITH AUTOMATIC DETERMINATION OF GEOGRAPHIC LOCATION

FIELD OF THE INVENTION

The invention relates generally to passive optical networks and, more particularly, to facilitating service activation in passive optical networks.

BACKGROUND OF THE INVENTION

Passive Optical Networking (PON) enables the shared use of fiber for services such as data, voice and video over most of the distance between a central office and service subscriber sites. PON is significantly less expensive to deploy and operate due to the compact size and passive nature of much of the equipment comprised by the PON facilities. For example, a passive optical splitter that fans the fiber out to service subscribers in a PON is relatively small, uses no electronics and requires no power source.

Current and emerging PON solutions offer cost-effective, end-to-end solutions that are capable of delivering a combination of high-demand services. Specific examples of such current and emerging PON solutions include Broadband PON (BPON), Ethernet PON (EPON) and Gigabit PON (GPON). Examples of services that can be provided via such PON solutions include various types of telephony services, data transmission services and video services. Signals for such services are transported optically from the central office (CO) or headend (HE) to an optical-network termination unit (referred to herein as the ONT) at a service subscriber's site. The ONT is configured to provide optical network termination functionality and, in some implementations, to also provide conventional network interface device functionality.

Before a service subscriber can receive requested services via PON, an ONT must be installed at the service subscriber's site and requested services must be activated. The conventional approach for activating service for a particular service subscriber is performed in conjunction with installing the subscriber's ONT. A field technician, commonly referred to as a Craft, carries out physical installation of an ONT (e.g., a ONT having a particular serial number) at a new subscriber's site. After the ONT is installed, the Craft initiates communication with a service activator (i.e., a person) who performs activation of the subscriber's service, with the Craft providing manual provisioning assistance as needed at the subscriber site. Activating the PON services includes provisioning the requested services and associating the provisioned services with the ONT.

The capability of selecting an arbitrary ONT for installation at a customer site provides the operating company with a significant level of flexibility in achieving the goal of quick and efficient service activation. In order to permit the aforementioned installation of an arbitrarily selected ONT, the rest of the PON system needs to receive enough information to associate the newly installed ONT with the particular set of provisioning information required to activate the services requested by the subscriber located where the ONT is installed. One conventional option for accomplishing this is to arrange the system so that the installer of the ONT (i.e., the Craft) provides this information to the ONT manually. Thereafter, the ONT can provide the information to the Optical Line Terminal (OLT) and/or any other management entity in the system, and the proper association of provisioning with the newly installed ONT can then be made automatically by the system.

In some conventional systems, the information manually provided by the installer is a site identifier or other information which identifies the geographic location where the ONT has been installed. The ONT then sends this site identifier/location information together with it's own identification information (for example its serial number) to the OLT/management entities in the system. In response to the ONT identifier and the site identifier, the OLT/management entities in the system can automatically perform the process of associating provisioning with the newly installed ONT.

The installer can utilize several different types of devices to manually provide the site identifier/geographic location information to the ONT, for example, a butt end device or other similar device, or an Ethernet RS 232-based input device. However, any such mechanism which provides manual access to the ONT represents a security risk, because the access port that is used to provide the site identifier/geographic location information is also available to unauthorized users. One way to avoid such a security risk is for the installer to report the site identifier/geographic location information directly to the OLT/management entities of the system, without ever providing the site identifier/geographic location information to the ONT. In this situation, the ONT does not require any mechanism (or the attendant security risk) for permitting the installer to manually provide the site identifier/geographic location information to the ONT.

It is desirable in view of the foregoing to be able to provide the ONT's identity and its site identifier to an OLT/management entity without manually inputting the site identifier to the ONT and without requiring the installer to manually report the site identifier to the OLT/management entity.

Exemplary embodiments of the present invention permit the ONT to determine its own geographic location information automatically, so the ONT can report its identity and its geographic location information to an OLT/management entity automatically, without manual intervention.

DETAILED DESCRIPTION

Figure 1:
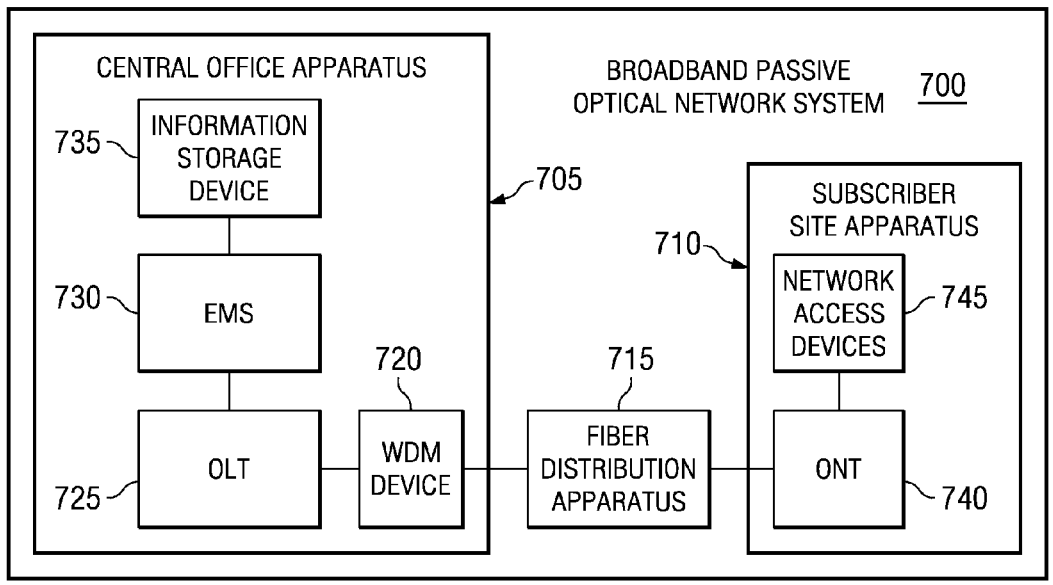
FIG. 1 diagrammatically illustrates exemplary embodiments of a BPON system according to the invention.

Referring now to FIG. 1, a Broadband Passive Optical Network (BPON) system 700 capable of carrying out the methods processes and operations disclosed herein is depicted. The BPON system 700 includes a central office apparatus 705, a subscriber site apparatus 710 and a fiber distribution apparatus 715 connected therebetween. Information is transmitted bi-directionally between the central office apparatus 705 and the subscriber site apparatus 710 via the fiber distribution network 715.

A BPON system, the current global standard for passive optical networking systems, is a combination of PON and Wavelength Division Multiplexing (WDM) solutions. PON enables the shared use of fiber for services such as data voice and video over most of the distance between a central office and service subscriber sites. Wavelength Division Multiplexing (WDM) divides light signals into different colors (i.e., wavelengths) and enables bi-directional transmission over a single fiber. WDM enables multiple transmissions to and from service subscriber sites to travel as different colors of light over the same fiber using multiplexing and demultiplexing techniques, thus allowing a single fiber connection to serve multiple service subscribers. Each color of light has its own wavelength and its own frequency. The electronic equipment on each end of the fiber can distinguish the different signals by their color. Accordingly, a first wavelength of light (i.e., a first color) may be used for transmitting information in a first direction through a fiber of the fiber distribution apparatus 715 (e.g., toward the subscriber site apparatus 710) and a second wavelength of light (i.e., a second color) may be used for transmitting information in a second direction through a fiber of the fiber distribution apparatus 715 (e.g., toward the central office apparatus 705).

The central office apparatus 705 facilitates the transmission of information between the subscriber site apparatus 710 and a core network (i.e., a network including various public networks such as the Internet and private networks). The central office apparatus 705 includes a WDM device 720, an OLT 725, an Element Management System (EMS) 730 and an information storage device 735. The WDM device 720 is configured for providing WDM functionality, as discussed above. The OLT provides network-side interfaces and functions as an optical access multi-plexer for performing concentration and grooming of broadband packet traffic between the core network and the subscribers. The EMS 730 includes software that manages sets of OLT's (e.g., via software capable of facilitating at least a portion of the methods, processes and/or operations disclosed herein). The information storage device 735 provides storage space of information instantiations (e.g., database records) corresponding to the each OLT and/or ONT in the BPON system 700.

The subscriber site apparatus 710 includes an ONT 740 connected between one or more network access devices 745 at the subscriber site and the fiber distribution apparatus 715. The ONT 740 is a network interface device that serves information to and/or transmits information from such one or more network access devices 745 at the subscriber site. Computers, telephones, televisions and the like are examples of such network access devices 745. In at least one embodiment of the BPON system 700, the ONT 740 includes software capable of facilitating at least a portion of the methods, processes and/or operations disclosed herein.

The fiber distribution apparatus 715 includes fiber optic cables, splicing enclosures, fiber distribution cabinets/enclosures, drop boxes and the like. An advantageous aspect of the fiber distribution apparatus 715 is that it includes only passive elements. In one embodiment, the fiber distribution apparatus depicts a point-to-multipoint downstream fiber network (i.e., toward the subscriber site apparatus 710) and a multipoint-to-point upstream fiber network (i.e., toward the central office apparatus 705).

A BPON system, such as the BPON system 700 disclosed above, represents one example of a PON system which can implement the methods, processes and/or operations disclosed herein. It is contemplated herein that other current, emerging and yet to be developed PON solutions are also capable of carrying out the methods, processes and/or operations disclosed herein. EPON and GPON systems are examples of such other PON solutions capable of carrying out the methods, processes and/or operations disclosed herein.

Figure 2:
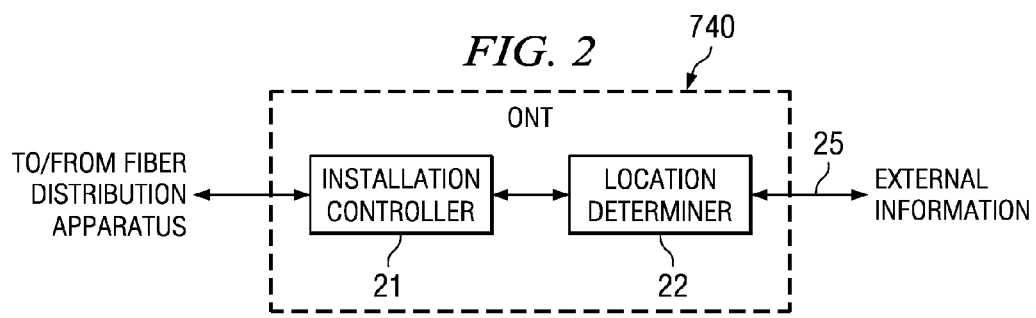
FIG. 2 diagrammatically illustrates exemplary embodiments of the ONT of FIG. 1 according to the invention.

FIG. 2 diagrammatically illustrates exemplary embodiments of the ONT 740 of FIG. 1. The ONT of FIG. 2 includes a location determiner 22 which utilizes an external interface 25 to obtain information from a source external to the ONT. The location determiner then utilizes this externally-provided information to determine, automatically and without manual intervention or assistance, the current geographic location of the ONT. The location determiner 22 is coupled to an installation controller 21. The installation controller 21 generally oversees the process of ONT installation. Once the location determiner 22 has determined the geographic location of the ONT, it provides this geographic location information to the installation controller 21, which can then forward (via fiber distribution 715) the geographic location information to the OLT/management entity, together with the ONT's identifier, and any other information which might be pertinent to the process of installing and activating the ONT.

When the ONT is powered-up or restarted, the location determiner 22 can, automatically and without manual intervention or assistance, utilize the external interface 25 to obtain the external information, and can then use this external information, automatically and without manual intervention or assistance, to determine the desired location information. The installation controller 21 receives the location information from the location determiner 22, and forwards the location information to the OLT/management entity as described above. In some embodiments, the installation controller 21 can, other than its above-described interaction with the location determiner 22, employ generally conventional techniques to oversee the installation and activation of the ONT.

In some exemplary embodiments, the location determiner 22 is a conventional Global Positioning System (GPS) receiver, the external interface 25 is an associated wireless communication interface for communication of conventional GPS information to and from a component of GPS, and the location information provided from the location determiner 22 to the installation controller 21 includes latitude and longitude coordinates produced by the GPS receiver in response to information received from the GPS component.

Referring again to FIG. 1, in some exemplary embodiments, when the OLT 725 receives the ONT identifier and the ONT location information, the OLT 725 can utilize generally conventional techniques to proceed with provisioning the ONT based on the ONT identifier and the ONT location information.

Figure 3:
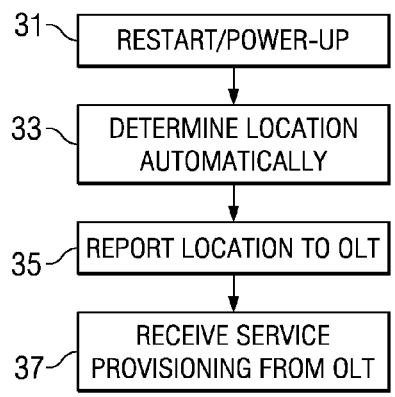
FIG. 3 illustrates exemplary operations which can be performed by the system of FIGS. 1 and 2.

FIG. 3 illustrates exemplary operations which can be performed by the system of FIGS. 1 and 2 according to the invention. After restart or power-up at 31, the ONT determines its location automatically at 33, and thereafter reports the location information to the OLT at 35. At 37, the ONT receives from the OLT service provisioning information that has been determined by the OLT in response to the location information that it has received from the ONT.

It will be apparent to workers in the art that the embodiments of FIGS. 1-3 can be readily implemented by, for example, suitable modifications in software, hardware, or both, in conventional PON systems.

Although exemplary embodiments of the invention are described above in detail, this does not limit the scope of the invention, which can be practiced in a variety of embodiments.

What is claimed is:

1. An optical network termination apparatus, comprising:
a communication interface for outputting information to an optical communication link;

a location determiner for determining, automatically and without manual intervention, information indicative of a present geographic location of the apparatus; and said location determiner coupled to said communication interface for outputting the determined location information to the optical communication link; wherein said location determiner includes a further communications interface for receiving, automatically and without manual intervention, further information from a source external to the apparatus; and the further information includes information produced by a GPS component.

2. The apparatus of claim 1, wherein said further communication interface is a wireless communication interface.

3. The apparatus of claim 2, wherein said location determiner includes a GPS receiver.

4. The apparatus of claim 2, wherein said further information includes information produced by a GPS component.

5. The apparatus of claim 4, wherein the GPS component is the external source.

6. The apparatus of claim 2, wherein the location information includes latitude and longitude coordinates.

7. The apparatus of claim 1, wherein the GPS component is the external source.

8. A method of operating an optical network termination apparatus, comprising:

automatically and without manual intervention, determining within the optical network termination apparatus information indicative of a present geographic location of the optical network termination apparatus; and outputting the determined location information for delivery to a destination that is external to the optical network termination apparatus; wherein said determining step includes receiving, automatically and without manual intervention, further information from a source external to the optical network termination apparatus; and the further information includes information produced by a GPS component.

9. The method of claim 8, wherein said receiving step includes receiving said further information via a wireless communication interface.

10. The method of claim 9, wherein said further information includes information produced by a GPS component.

11. The method of claim 10, wherein the GPS component is the external source.

12. The method of claim 9, wherein the location information includes latitude and longitude coordinates.

13. The method of claim 8, wherein the GPS component is the external source.

14. The method of claim 8, including deciding provisioning for the optical network termination apparatus in response to the location information.

15. A passive optical network, comprising:

an optical network termination apparatus;

a management apparatus for determining provisioning for the optical network termination apparatus;

an optical communication link coupled between said management apparatus and said optical network termination apparatus for permitting communication therebetween; and said optical network termination apparatus including a location determiner for determining, automatically and without manual intervention, information indicative of a present geographic location of the optical network termination apparatus, said location determiner coupled to said optical communication link for providing said location information to said management apparatus; wherein said location determiner includes a GPS receiver.

16. The network of claim 15, wherein said management apparatus includes an optical line terminal.

17. The network of claim 15, provided as a broadband passive optical network.

\* \* \* \* \*